Jan. 15, 1957 G. HOHWART ET AL 2,777,701
EXPANSION ARBOR
Filed Jan. 8, 1953
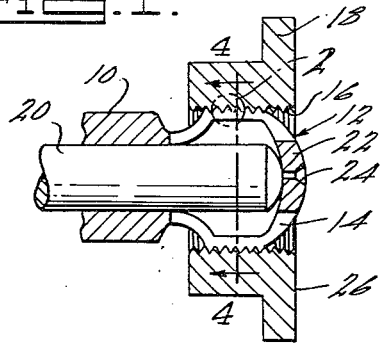
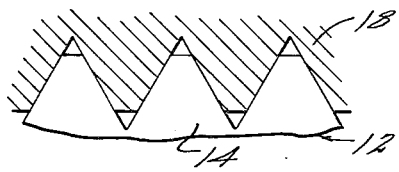
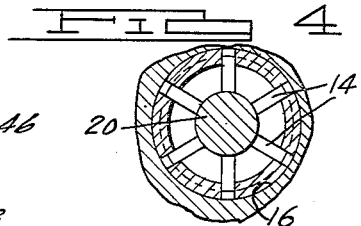
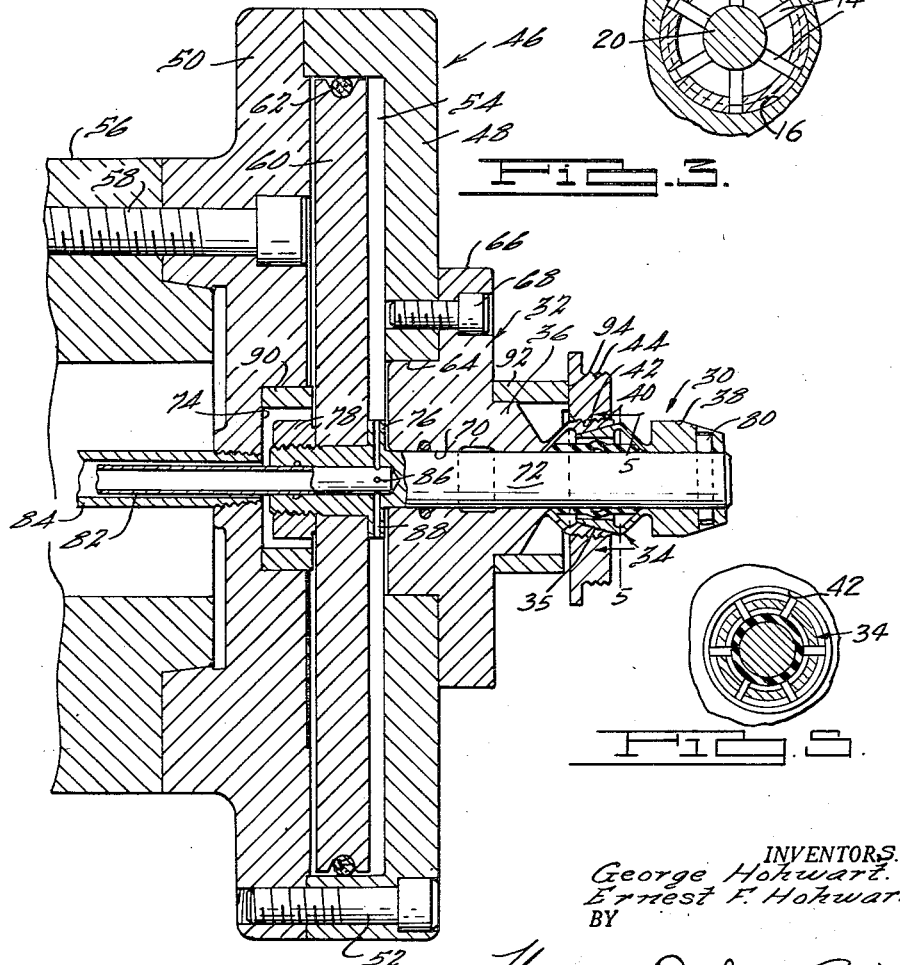
INVENTORS.
George Hohwart.
Ernest F. Hohwart.
BY
Harness, Dickey & Pierce.
ATTORNEYS ം
United States Patent Office 2,777,701
Patented Jan. 15, 1957

2,777,701
EXPANSION ARBOR

George Hohwart, Farmington Township, Oakland County, and Ernest F. Hohwart, Detroit, Mich., assignors to N. A. Woodworth Company, Ferndale, Mich., a corporation of Michigan Application January 8, 1953, Serial No. 330,283

2 Claims. (Cl. 279—2)

This invention relates to new and useful improvements in chucking devices.

This is a continuation in part of our copending application Serial No. 119,192 filed October 1, 1949, which matured into Patent No. 2,628,811, January 27, 1953.

An important object of the present invention is to provide a chuck that is adapted primarily for threaded workpieces.

Another object of this invention is to provide a chuck that will engage the threads of a workpiece and hold the same stationary for a machining or other operation.

Still another object of the invention is to provide a chuck of the above-mentioned character that is operative to hold a workpiece exactly in coaxial relation with the arbor and with the ends of the workpiece exactly at right angles to the center of the arbor.

Other objects and advantages of the invention will be apparent during the course of the following description.

In the drawing forming a part of this specification and wherein like numerals are employed to designate like parts throughout the same, Fig. 1 is a longitudinal sectional view of an arbor embodying the invention, Fig. 2 is an enlarged view of the portion of Fig. 1 enclosed in the circle 2, Fig. 3 is a longitudinal sectional view showing a modified arbor construction embodying the invention, Fig. 4 is a fragmentary, transverse sectional view taken on the line 4—4 of Fig. 1, and Fig. 5 is a fragmentary, transverse sectional view taken on the line 5—5 of Fig. 3.

It is contemplated that the arbor of this invention be adapted for either internally or externally threaded workpieces, and the manner in which the arbor can be adapted for these two types of operations is clearly set forth in the copending parent application hereinabove referred to. As the broader concepts of the invention are clearly defined in the parent application it is thought that this application need not be unduly burdened with numerous illustrations showing modified structures all operating on the same principle but individually adapted to function in a special capacity or to co-operate with particular workpieces. In accordance with this view we have shown in this application two forms of the invention which are believed to illustrate adequately the principle of operation and to provide a basis for the appended claims.

Reference is now had to the form of the invention illustrated in Figs. 1 and 2 which show a chuck uniquely constructed to clamp internally the threaded bore of a workpiece. This chuck is particularly efficacious to grip the workpiece absolutely solidly and holds the same precisely centered on the clamping arbor. Thus, the chuck is useful for many conventional machining and checking operations. For example, the chuck provides a means for machining a face of a workpiece exactly square with respect to the center line of a previously formed internal thread. Also the chuck can be used to advantage to check concentricity of a surface with respect to the center of a threaded hole in the work. To our knowledge, no other chuck is known which is capable of satisfactorily performing this operation.

The particular form of the invention shown in the drawing comprises an elongated, tubular arbor 10 having a single clamping section 12. The clamping section 12 here shown is formed with a plurality of circumferentially spaced longitudinal slots 14. All of the slots 14 are coextensive, and the portions of the arbor between the slots are bowed radially outwardly so as to be inherently springy or resilient when the arbor 10 is stressed longitudinally. Also, in this form of the invention, the clamping section 12 is formed with a generally cylindrical peripheral surface which is externally threaded to receive the internally threaded bore 16 of a workpiece 18. A plunger 20 is mounted for longitudinal sliding movement in the arbor 10, and the distal end of the plunger bears against the closed forward end 22 of the arbor. The arbor 10 and the plunger 20 may be adapted for either mechanical or manual operation.

In making the device, the arbor 10 is first given the general form shown in the drawing and the clamping section 12 is then tensioned by applying force against the plunger 20. The outer surface of the clamping section 12 is then ground to a proper, predetermined diameter and externally threaded while the arbor is under tension.

Thus, the workpiece 18 can be easily screwed onto the clamping section 12 when the arbor 10 is tensioned. However, as soon as pressure against the arbor is relieved, the clamping section 12 flexes to its normal position; and as the clamping section flexes, it expands radially to jam the external threads thereof against the internal threads of the work 18. This action clamps the work 18 solidly to the arbor 10 for a machining or other operation. If necessary or desirable, additional force may be imposed on the work by tightening the center point of a tailstock or equivalent mechanism against the distal end 22 of the arbor 10. To this end, a center receiving socket 24 is provided in the end 22. Since the slots 14 are equispaced around the circumference of the clamping section 12 and since the wall of the clamping section is of uniform thickness, all of the arched portions intermediate the slots exert a uniform pressure radially outwardly against the work. As a result, the work 18 is centered exactly on the axis of the arbor 10 and this axis coincides precisely with the axis of the internally threaded hole 16. This being true, any radial face of the workpiece, such as the face 26, for example, can be readily ground or machined exactly at right angles to the axis of the internally threaded bore 16.

Attention is now directed to Fig. 3 which illustrates an arbor carried and actuated by a fluid motor. Specifically, the arbor comprises a tubular outer portion 30 which extends centrally from a radially enlarged mounting portion 32. The arbor 30 has a single clamping portion 34 that may be fashioned as described in connection with the first form of the invention or as described in our copending application Serial No. 273,107, now Patent No. 2,684,854. The latter construction is illustrated in the drawing here under consideration. In this construction the clamping portion 34 is made in two parts having tapered mating surfaces 35, and the parts are brazed together at the surfaces 35 to integrally join the parts. In so far as the present invention is concerned, however, it makes no difference which construction is employed. The primary concern is that the clamping portion 34 be disposed between and connected to circumferentially continuous terminal portions 36 and 38, that it be provided with a plurality of circumferentially spaced coextensive longitudinal slots, that the clamping elements defined by the slots be longitudinally arched radially outwardly so as to be capable of flexure when the arbor is stressed axially, and that the clamping elements be externally threaded as at 40 to receive the co-operating threads 42 of a workpiece 44. The particular arbor here shown is adapted to receive an internally threaded workpiece as will be apparent from the drawing.

The fluid motor 46 which carries and operates the arbor 30 comprises a generally cup-shaped member 48 mounted on a disk-shaped backing plate 50. The member 48 is fastened securely to the plate 50 by an annular series of screws 52, and the two parts mutually co-operate to define an inner cylinder 54. It is contemplated that the fluid motor 46 be either movable or stationary, depending upon the exigencies of the particular situation. In the drawing, the motor 46 is shown fastened to a spindle 56 of a suitable machine tool (not shown) by screws 58 which extend rearwardly through the backing plate 50 into the spindle. Mounted for reciprocation in the cylinder 54 is a piston 60, and the periphery of the piston is sealed against the annular wall of the cylinder by an O ring 62 or the like so that pressure can be built up in the cylinder at either side of the piston to move the latter either forwardly or rearwardly.

The mounting portion 32 of the arbor fits snugly in an opening 64 provided centrally in the forward wall of the cylinder 54, and a radial flange 66 on the mounting portion is fastened securely to the mentioned wall of the cylinder by an annular series of screws 68. Thus, the longitudinal bore 70 of the arbor is in direct communication with the cylinder 54. In this connection, it will be observed that the piston 60 is rigidly fixed to the arbor by a push rod 72 disposed in the bore 70. The inner or rearward end of the push rod 72 extends through the piston 60, and the projecting terminal thereof is received within a central recess 74 provided centrally in the backing plate 50. As clearly shown in the drawing, a radial flange 76 formed on the push rod within the cylinder 54 ahead of the piston 60 is held solidly against the piston by a nut 78 on the projecting end of the rod. At its forward or outer end the push rod 72 is fastened securely to the arbor 30 by a cross pin 80. Thus, the piston 60 is clamped between the flange 76 and the nut 78, and the push rod 72 is constrained thereby to move forwardly and rearwardly with the piston. As the piston 60 moves forwardly it acts through the push rod 72 and cross pin 80 to place the clamping section 34 under tension, and as the piston moves rearwardly it acts through the same agencies to place the clamping section under compression.

The piston 60 may be actuated in any suitable or conventional manner. By way of illustration means are shown in the drawing for operating the piston 60 by air pressure. To this end, inner and outer pipes 82 and 84 are provided in the backing plate 50. These pipes 82 and 84 extend from any suitable source of air under pressure and flow of air through the pipes is selectively controlled by a conventional three-way valve (not shown) or in any other suitable manner. The inner pipe 82 extends for a limited distance into the push rod 72, and the inner end thereof is provided with an annular series of openings 86 which communicate with radial passages 88 in the flange 76. Thus, air under pressure traversing the inner pipe 82 is directed through the openings 86 and passages 88 into the cylinder 54 ahead of the piston 60. Air thus admitted exerts pressure against the piston 60 and moves it rearwardly in the cylinder. The pipe 84, on the other hand, opens directly into the recess 74 and air under pressure traversing the outer pipe thus is admitted into the cylinder 54 behind the piston 60. This air exerts pressure against the piston 60 and moves the latter forwardly in the cylinder 54. Forward travel of the piston 60 is limited by engagement of the flange 76 with the mounting portion 32 of the arbor, and rearward travel of the piston is limited by a stop ring 90 set into and seating against the bottom of the recess 74. Both the forward and rearward stops prevent the piston from seating against the ends of the cylinder 54 and blocking admission of air into the cylinder or otherwise causing the piston to stick or to resist initial movement thereof by the air pressure.

In use, the workpiece 44 is first threaded on the clamping portion 34 of the arbor. In this connection it is contemplated that the arbor may be made sufficiently undersize with respect to the workpiece so that the latter can be easily threaded on the arbor when the clamping portion is unstressed or relaxed. Also, it is contemplated that the clamping portion 34 be normally slightly larger in diameter than the internal bore of the workpiece 44 so that the arbor must be tensioned in order to reduce the diametrical size of the clamping portion sufficiently to accommodate the workpiece. In the latter situation air is admitted into the cylinder 54 behind the piston 60 through the outer pipe 84 in order to tension the arbor and reduce the clamping portion 34.

The instant construction is adapted primarily for uses where maximum clamping pressure is desired between the arbor and the workpiece; and after the workpiece 44 has been screwed onto the arbor in one or the other of the ways suggested above, the portion of the cylinder 54 behind the piston 60 is vented, and air under pressure is admitted to the cylinder ahead of the piston. This causes the piston 60 to retract in the cylinder 54, and as the piston retracts it pulls on the rod 72 to place the arbor 30 under compression. As the arbor is compressed, the clamping portion 34 is expanded radially outwardly and pressed solidly against the workpiece. In this connection it will be appreciated that the construction wherein the clamping portion is made slightly oversize with respect to the workpiece 44 is preferred, as substantial clamping pressure is obtained between the arbor and the workpiece by merely releasing pressure behind the piston 60 so that the natural resiliency of the clamping portion 34 causes it to expand tightly against the workpiece. In the second alternative construction, this natural or inherent clamping action is augmented and greatly increased when air under pressure is admitted into the cylinder ahead of the piston. Considerable clamping pressure is desired in many situations and particularly where a machining operation is to be performed on the workpiece.

In connection with the foregoing, it should be noted that the unique construction of the arbor causes the external threads of the clamping portion 34 to seat on the pitch line of the internal threads of the workpiece 44 so that the workpiece is positioned automatically in coaxial relation with respect to the arbor. This assures exact parallelism between bores or passages drilled in the workpiece and also assures that end faces of the workpiece can be machined or otherwise finished exactly at right angles to the axis of the hole being chucked. Both of these factors are exceedingly important in many machining operations.

In order to expedite positioning of the workpiece on the arbor and to relieve the interengaging threads of the arbor and workpiece when a machining or other operation is being performed on the workpiece which tends to move it axially on the arbor, suitable stop means is provided behind the workpiece. In the particular form of the invention here shown by way of illustration, the stop comprises an annular collar 92 having a plurality of angularly spaced forward projections 94. These projections 94 are coextensive and simultaneously engage the workpiece 44. As suggested, the projections 94 back up and reinforce the workpiece 44 and also hold it properly positioned for engagement by the arbor when the latter is relaxed or under tension to disengage the chucking portion from the workpiece.

Having thus described the invention, we claim:

1. A chucking arbor comprising an elongated tubular body having an inherently resilient clamping portion provided with a generally cylindrical threaded surface adapted to engage corresponding threads of a workpiece to be chucked by the arbor, a cylinder on the body at one end of said clamping portion, a power piston in said cylinder, and means interconnecting said piston and said body at the end of said clamping portion remote from said cylinder, whereby movement of the piston in one direction stresses the body axially to prepare said threaded surface for engagement with the workpiece and movement of the piston in the opposite direction stresses the body axially to engage the threads of the body with the threads of the work.

2. A chucking arbor comprising an elongated tubular body having an intermediate portion provided with a plurality of circumferentially spaced longitudinal slots, said slots defining clamping elements and said elements being threaded to engage a correspondingly threaded workpiece, said clamping elements being longitudinally arched and inherently flexible and resilient, a cylinder on the body at one end of said intermediate portion, a piston reciprocable in the cylinder and means interconnecting the piston with the body at the side of said intermediate portion remote from the cylinder permitting said clamping portions to be selectively tensioned and compressed by movement of the piston axially in said cylinder.

References Cited in the file of this patent

UNITED STATES PATENTS

| | | |
|---|---|---|
| 761,348 | Baines | May 31, 1904 |
| 1,427,155 | Haven | Aug. 29, 1922 |
| 1,617,672 | Delany | Feb. 15, 1927 |
| 2,546,950 | Nixon | Mar. 27, 1951 |
| 2,626,811 | Hohwart et al. | Jan. 27, 1953 |
| 2,684,854 | Hohwart et al. | July 27, 1954 |